United States Patent Office 3,468,915
Patented Sept. 23, 1969

---

3,468,915
NOVEL 2-SUBSTITUTED-6-METHYL-PYROMECONIC ACIDS
Bryce E. Tate, Niantic, Conn., assignor to Chas. Pfizer & Co., Inc., New York, N.Y., a corporation of Delaware
No Drawing. Filed Apr. 18, 1966, Ser. No. 543,085
Int. Cl. C07d 7/16; A23l 1/26; C11b 9/00
U.S. Cl. 260—345.9                    4 Claims

---

ABSTRACT OF THE DISCLOSURE

Novel 2-substituted-6-methylpyromeconic acids which are useful as aroma and flavor enhancers in edibles, perfumes, and tobacco, growth inhibitors of bacteria, yeasts, and fungi, and oil-soluble chelating agents, can be prepared by condensing kojic acid or 6-methylpyromeconic acid with an aldehyde and reducing the intermediates obtained thereby.

---

The present invention relates to new and useful organic compounds. More particularly, it contemplates 2-substituted-5-methylpyromeconic acids and process for their use. These gamma pyrones have chelating properties, microbiological activity and the lower molecular weight members of the class are useful as aroma and flavor enhancers in edibles, perfumes and tobacco.

Among the valuable new compounds contemplated by the instant invention are those of the formula:

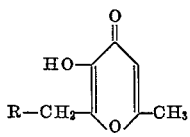

wherein R is hydrogen, alkyl having from 1 to 17 carbon atoms, phenyl, naphthyl, substituted phenyl or substituted naphthyl and each of said substituents is alkyl having from 1 to 12 carbon atoms, chlorine, bromine, iodine, alkoxy having from 1 to 12 carbon atoms or hydroxy. These compounds are useful as oil-soluble chelating agents. This property is important in controlling corrosion, for example, by combining with, and deactivating, ionic forms of metals which often exist in fluids such as fuel oil. The corrosion-promoting effect of such metals in their active ionic form is well known. The said compounds are also useful in preventing the growth of undesirable microorganisms such as, for example, bacteria, yeasts and fungi. Several members of the series can be added to foods and beverages, to perfumes and to tobacco wherein they provide a pleasing enhancement of aroma and flavor.

Also contemplated by the instant invention are compounds of the formula:

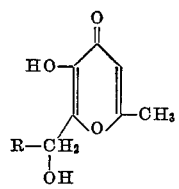

wherein R is hydrogen, alkyl having from 1 to 17 carbon atoms, phenyl, naphthyl, substituted phenyl or substituted naphthyl and each of said substituents is alkyl having from 1 to 12 carbon atoms, chlorine, bromine, iodine, alkoxy having from 1 to 12 carbon atoms or hydroxy. These compounds serve as valuable intermediates in the preparation of the 2,6-di-substituted pyromeconic acids obtained therefrom by reduction processes.

The valuable compounds of the present invention are prepared by a process utilizing as its starting material an economical and freely available fermentation product, kojic acid (I). Kojic acid is treated in accordance with the following reaction scheme:

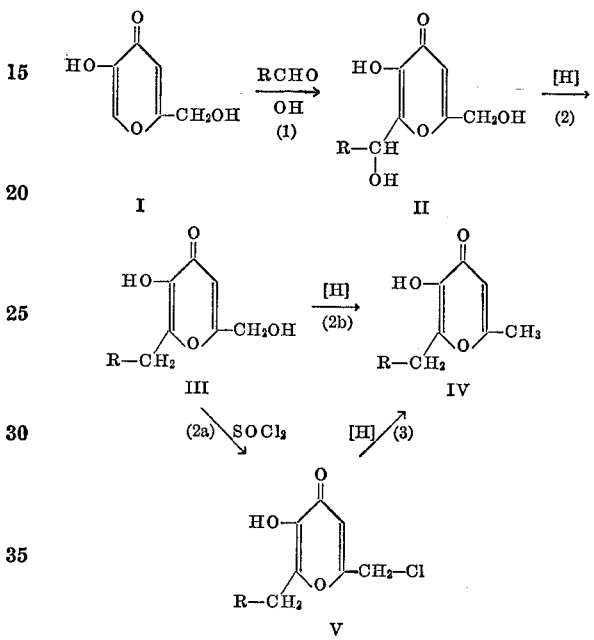

wherein R has the meaning defined hereinbefore.

In step (1), kojic acid is converted to a 2-(1-hydroxyalkyl)-6-hydroxymethylpyromeconic acid or a 2-(1-hydroxy-1-arylmethyl)-6 - hydroxymethylpyromeconic acid (II), in excellent yield, by carrying out the reaction at a pH above about 5, preferably above about 8, with an appropriate aldehyde. Aldehydes will contain from about 1 through 18 carbon atoms. Among these might be mentioned, for example, acetaldehyde, propionaldehyde, butyraldehyde, isobutyraldehyde, hexanal, decanal, octadecanal, benzaldehyde, tolualdehyde, naphthaldehyde, 2,6-dimethylnaphthaldehyde, and the like. Of course, as is obvious to those skilled in the art, with the higher, less water-soluble aldehydes, it is desirable to use a water-miscible solvent to provide for more intimate mixing of the reagents, and, as will be exemplified in detail hereinafter, dioxane is a useful solvent in this step.

Bases such as sodium hydroxide, potassium hydroxide, lithium hydroxide and the like can be used for bringing the pH of the reaction mixture to the desired alkalinity, that is, above at least 5. For optimum yields, it is preferred to limit the amount of aldehyde added to one mole equivalent based on kojic acid. The use of an excess of aldehyde has a tendency to decrease the purity of the product if an aqueous medium is employed.

An alternate route which has been found effective in producing 2-alkyl and 2-aryl-substituted-6-methylpyromeconic acids consists in reacting 6-methylpyromeconic acid with an aldehyde as described above and reducing the 2-(1-hydroxyalkyl) - 6 - methylpyromeconic acid or 2-(1-hydroxy-1-arylmethyl) - 6 - methylpyromeconic acid produced. This reaction proceeds in the following sequence of steps:

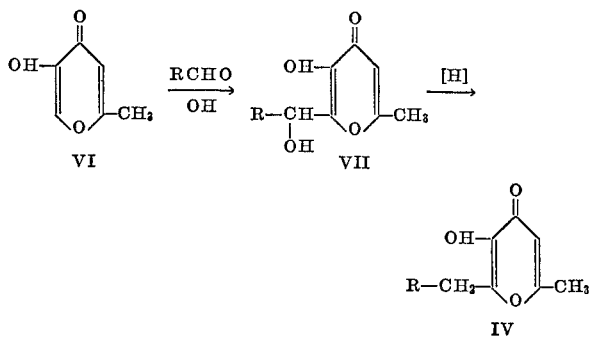

The following represents a preferred embodiment of step (1) in the process: the appropriately-substituted pyromeconic acid is added to about 4 times its weight of water and to the desired mixture is added sufficient 50% by weight aqueous base solution to bring the pH of the resulting mixture to about 10. To this solution is added one mole equivalent of the appropriate aldehyde dissolved in minimum volume of dioxane. The resulting mixture is stirred at 50° C. for about 18 hours, then is cooled and adjusted to pH 2 with strong acid. Cooling the reaction mixture to about 5° C. causes the desired product II to precipitate in crystalline form from the reaction mixture from which it is recovered by filtration.

With respect to step (2), the conversion of 2-(1-hydroxyalkyl) - 6-hydroxymethylpyromeconic acid or 2-(1-hydroxy-1-arylmethyl) - 6-hydroxymethylpyromeconic acid (II) or the 2-(1-hydroxyalkyl)-6-methylpyromeconic acid or 2-(1-hydroxy-1-arylmethyl) - 6-methylpyromeconic acid (VII) to the corresponding 2-alkyl or 2-aryl-methyl-6-hydroxymethylpyromeconic acid (III) or the 2-alkyl or 2-arylmethyl-6-methylpyromeconic acid (IV) is carried out under acidic or substantially neutral conditions. If such a reaction is attempted in an alkaline medium wherein the said hydroxy-substituted-pyromeconic acid species is predominantly in its anionic form, the yield of product is very low after treatment of the solution with a reducing agent. A number of reducing agents may be employed in this step. For example, a zinc-hydrochloric acid combination or similar metal-acid combinations or, alternatively, chemical reducing agents, or hydrogen and a catalyst may be used. When metal-acid combinations are used as the reducing agent, it has been found that zinc, iron, aluminum, tin, magnesium, and the like, are especially effective. And, it is preferred to use zinc, since this metal in addition to being low in price, has the advantage of providing products of somewhat higher purity and lighter color. Mineral or monocarboxylic saturated open-chain aliphatic acids having from one to ten carbon atoms and which are soluble in the reaction system can be employed in combination with metals of the type mentioned. Among the mineral acids which are particularly effective are hydrochloric and sulfuric acids and among the organic acids which are particularly effective are formic and acetic. It is especially preferred to use hydrochloric acid in this step since the compound formed has a tendency to be obtained in higher yield and higher purity. Among the chemical agents useful in this step are hydro-sulfurous acid, or an alkali or alkaline earth metal salt thereof. For example, there can be used sodium-, potassium-, lithium-, calcium- and magnesium hydrosulfite, and the like. Especially preferred because it is freely-available, economical, and is an especially strong reducing agent, is sodium hydrosulfite. An additional effective reducing agent for use in this step is hydrogen. It is necessary to use a noble metal catalyst such as platinum or palladium to effect the reduction with hydrogen and it has been found that the best yields are obtained at pH range of from about 1 to about 3.

An especially convenient embodiment of step (2) comprises adding about one volume of the appropriate 2-(1 - hydroxyalkyl) - 6 - hydroxymethylpyromeconic acid, 2-(1-hydroxyl-1-arylmethyl) - 6-hydroxymethylpyromeconic acid (II), 2-(1-hydroxyalkyl) - 6-methylpyromeconic acid or the 2-(1-hydroxyl-1-arylmethyl) - 6-methylpyromeconic acid (VII) to about 5 volumes of water and treating the suspension with enough strong acid, for example, sulfuric or hydrochloric to bring the pH to below about 5. The slurry is then heated to about 50–55° C., and an amount of zinc dust is added equivalent to about 2 moles per mole of compound to be reduced. Although this is a 100% excess, with certain grades of zinc dust less may be required. The reason for the variation in efficiency between certain grades of zinc dust is not clearly understood at the present time, although in some cases 1.3 moles of zinc per mole of substituted pyromeconic acid has been found to be sufficient. The reaction mixture is then stirred vigorously and an aqueous solution of about 10 N hydrochloric acid containing at least a stoichiometrically-equivalent amount of acid based on the hydroxymaltol present is slowly added over a period of about 1 hour. After all the acid has been added, the reaction mixture is maintained at about 55–60° C. for from about 3 to about 5 hours. Sodium hydroxide is used to bring the pH to about 2 and the mixture is filtered hot. On cooling, the product crystallizes and is collected.

The formation of the compounds represented by Formula IV, in accordance with the above scheme, directly from compounds of Formula II sometimes occurs, but it is preferred to use the compounds designated Formula III as starting materials for the alternative, two-step reaction sequence designated (2a) and (3) in order to obtain the best yields of new compounds designated IV. According to this scheme, the compounds of Formula III are treated with SOCl$_2$ and converted to the chlorine-containing compounds designated Formula V. Compounds of Formula V are then reacted according to step (3) by treatment with the reducing agents mentioned above to obtain, in high yields, the new compounds IV.

Since all of the compounds contemplated by the instant invention contain acidic hydrogen, in addition to the free acids, it is intended to include within this invention salts of the said compounds with metals and salts with organic bases. These salts can be formed by procedures well known to those skilled in the art, by reacting the new compounds with a base, such as alkali metal hydroxides, alkaline earth metal hydroxides or an organic base. Especially useful salts are those derived from sodium, potassium, and calcium and ammonia.

If it is desired to use 2,6-dimethylpyromeconic acid in enhancing the flavor and aroma of foods, it may be incorporated into the foods by any common technique employed by those skilled in the art. For example, if it is desired to enhance the flavor and aroma of bread, the new compound may be mixed with the dough, may be sprinkled on the surface of the bread, or may be incorporated into the bread wrapping to provide the desired effect. An especially desirable increase in flavor and odor appeal is obtained when the 2-alkyl-6-methylpyromeconic acids are added to edibles to provide from 1 to about 500 parts per million by weight. It is obvious to those skilled in the art to which this subject matter pertains that for varying purposes varying amounts are required. The optimum amount may be determined by experimentation. Thus, in some products the test subjects have difficulty in discerning 5 p.p.m. and also in some products less desirable effects are observed above about 500 p.p.m. With respect to enhancing the aroma of perfumes, generally the same levels of the instant compounds can be used, as are used in food. As will be understood by those skilled in the art, the precise amount of the 2-alkyl-6-methylpyromeconic acid and the 2-arylmethyl-6-methylpyromeconic acid, to be added will depend on the desired strength of the perfume odor itself. It is found especially convenient to substitute about ⅓ part by weight of, for example, 2-ethyl-6-methylpyromeconic acid for each 1 part by weight of maltol in those formulations wherein maltol is a component. Since, at the present time, maltol costs about $12 per pound, substantial savings may be obtained through the substitution of the compounds of this invention.

With respect to the term edibles, used herein and in the appended claims, it is contemplated to include compositions which are ordinarily eaten or drunk. For example, 2,6-dimethylpyromeconic and 2-benzyl-6-methylpyromeconic acids are powerful flavor and aroma enhancers for chocolate and vanilla products, candies, ice cream, puddings, cake mixes, cookies, pies, fruit juices, wines, liqueurs and flavor extracts. Furthermore, it can be used as a flavor and aroma component in canned and frozen fruits and vegetables, meat and fish products, cereals, macaroni and noodle products, soups, sauces and seasonings, prepared dressings and breads. In addition, among the edibles which can be benefitted by the process of the instant invention are pharmaceutical oral dosage forms, animal feeds and pet foods. With respect to the term perfumes, as used herein and in the appended claims, it is meant to contemplate concentrated essences, colognes and industrial odorants which are commonly used in cosmetic and hygienic products, such as are used in detergents and soaps, and in the perfuming of tobacco, paper, textiles, printing inks, food packages, paints, home deodorants and insecticides.

As has been mentioned hereinbefore, the compounds of this invention strengthen the flavor and aroma of a wide variety of products. It develops inherent flavors and creates, especially in sweet foods, a "velvet mouth sensation." Because it so strongly augments many inherent flavors, as for instance, that of chocolate, product reformulation may be required in some instances to achieve optimum taste. These reformulations are well within the capability of those skilled in the art. The compounds of this invention may be added to the food or perfume directly in the dry form or, alternatively, as a solution. Care should be taken to obtain even distribution through the use of pre-mixing, since small quantities have such a powerful effect.

The following specific examples illustrate the practice of this invention but are not to be construed as limiting the scope of the invention. On the contrary, it is to be clearly understood that various modifications and embodiments and equivalents may be resorted to, without departing from the spirit of the present invention and/or the scope of the appended claims.

Example I.—2,6-di(hydroxymethyl)pyromeconic acid

To a stirred slurry of 5,684.4 g. (40.0 moles) kojic acid in 20.0 l. deionized water at room temperature was added a solution of 1,110.0 g. sodium hydroxide in 2.0 l. deionized water. The resulting solution became warm and all the kojic acid dissolved. To the solution was then added 3.04 l. (40.4 moles) 37% aqueous formaldehyde over a 30 minute period from a dropping funnel with some heat evolution occurring. A water bath was then applied to keep the temperature at 35–40° C. for 2 hours.

The dark amber solution was then cooled in an ice water bath and a solution of 1,792.0 g. concentrated sulfuric acid in 2.6 l. deionized water was added over a period of 15 minutes. A precipitate formed and the mixture was cooled for about 1 hour. The crude product was filtered off, thoroughly washed with cold deionized water followed with cold AR acetone and dried in the atmosphere to give 5,345.0 g., M.P. 151.0–153.0° C.

The 5,345.0 g. of crude product was dissolved in 12.0 l. deionized water at a temperature of 65° C., Darco-G-60 treated, and cooled in an ice water bath for 2 hours. The off white crystalline material was collected, washed with cold deionized water followed with AR acetone and dried overnight in a steam oven to give 3,802.0 g. of product, M.P. 155.0–156.0° C.

A second recrystallization from 8.0 l. deionized water using the same procedure as above gave 3,684.0 g. (53.5% of theory) M.P. 155.0–156.0° C.

Example II.—2-(1-hydroxyalkyl)-6-hydroxymethylpyromeconic acids and 2-(1-hydroxy-1-arylmethyl)-6-hydromethylpyromeconic acids The procedure of Example I is used to prepare the following compounds, substituting for formaldehyde, the appropriately substituted higher aldehydes and, if necessary, employing dioxane as a solvent to insure miscibility of the reagents:

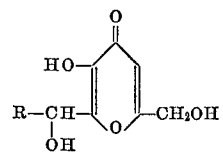

| Aldehyde | R |
|---|---|
| Propionaldehyde | $C_2H_5$ |
| n-Butyraldehyde | $C_3H_7$ |
| iso-Butyraldehyde | $i-C_3H_7$ |
| n-Hexaldehyde | $C_5H_{11}$ |
| n-Decyl-aldehyde | $C_9H_{19}$ |
| Hexadecanal | $C_{15}H_{31}$ |
| Benzaldehyde | $C_6H_5$ |
| p-Tolualdehyde | $p-CH_3C_6H_4$ |
| 2-napthaldehyde | $2-C_{10}H_7$ |
| 1-naphthaldehyde | $1-C_{10}H_7$ |
| 2,4-dimethyl-1-napthaldehyde | $C_{12}H_{11}$ |
| Acetaldehyde | $CH_3$ |
| Octadecanaldehyde | $C_{17}H_{35}$ |
| 5-methyl-1-naphthaldehyde | $C_{11}H_9$ |
| 4-methyl-1-naphthaldehyde | $C_{11}H_9$ |
| 6-methyl-2-naphthaldehyde | $C_{11}H_9$ |
| 4-tolualdehyde | $C_7H_7$ |
| 3-tolualdehyde | $C_7H_7$ |
| 4-dodecylbenzaldehyde | $C_{18}H_{29}$ |
| 4-dodecyl-1-naphthaldehyde | $C_{22}H_{31}$ |
| 6-dodecyl-1-naphthaldehyde | $C_{22}H_{31}$ |
| 4-dodecyl-2-naphthaldehyde | $C_{22}H_{31}$ |
| 6-dodecyl-2-naphthaldehyde | $C_{22}H_{31}$ |
| 4-methoxybenzaldehyde | $4-CH_3O-C_6H_4$ |
| 3-methoxybenzaldehyde | $3-CH_3O-C_6H_4$ |
| 4-butoxybenzaldehyde | $4-C_4H_7O-C_6H_4$ |
| 2-butoxybenzaldehyde | $2-C_4H_7O-C_6H_4$ |
| 4-methoxy-1-naphthaldehyde | $4-CH_3O-1-C_{10}H_8$ |
| 6-methoxy-1-naphthaldehyde | $6-CH_3O-1-C_{10}H_8$ |
| 4-butoxy-2-naphthaldehyde | $4-CH_3O-2-C_{10}H_8$ |
| 4-dodecyloxy-1-naphthaldehyde | $4-C_{12}H_{25}O-1-C_{10}H_8$ |
| 6-dodecyloxy-2-naphthaldehyde | $6-C_{12}H_{25}O-2-C_{10}H_8$ |
| 2-chlorobenzaldehyde | $2-Cl-C_6H_4$ |
| 2-bromobenzaldehyde | $2-Br-C_6H_4$ |
| 2-iodobenzaldehyde | $2-I-C_6H_4$ |
| 3-chlorobenzaldehyde | $3-Cl-C_6H_4$ |
| 3-bromobenzaldehyde | $3-Br-C_6H_4$ |
| 3-iodobenzaldehyde | $3-I-C_6H_4$ |
| 4-cholrobenzaldehyde | $4-Cl-C_6H_4$ |
| 4-iodobenzaldehyde | $4-I-C_6H_4$ |
| 2-chloro-1-napthaldehyde | $2-Cl-1-C_{10}H_8$ |
| 4-chloro-1-naphthaldehyde | $4-Cl-1-C_{10}H_8$ |
| 6-chloro-1-naphthaldehyde | $6-Cl-1-C_{10}H_8$ |
| 2-bromo-1-napthaldehyde | $2-Br-1-C_{10}H_8$ |
| 6-chloro-2-naphthaldehyde | $6-Cl-2-C_{10}H_8$ |
| 4-chloro-2-naphthaldehyde | $4-Cl-2-C_{10}H_8$ |
| 4-iodo-2-naphthaldehyde | $4-I-2-C_{10}H_8$ |
| 4-hydroxy-1-naphthaldehyde | $4-HO-1-C_{10}H_8$ |
| 5-hydroxy-1-naphthaldehyde | $5-HO-1-C_{10}H_8$ |
| 6-hydroxy-1-naphthaldehyde | $6-HO-1-C_{10}H_8$ |
| 2-hydroxybenzaldehyde | $2-HOC_6H_4$ |
| 3-hydroxybenzaldehyde | $3-HOC_6H_4$ |
| 4-hydroxybenzaldehyde | $4-HOC_6H_4$ |

Example III.—2-hydroxymethyl-6-methylpyromeconic acid

To 126 g. of 6-methylpyromeconic acid in 372 ml. of water is added a solution of 39.6 g. of sodium hydroxide in 126 ml. of water. The solution is cooled in an ice bath and 89 g. of a 37% formaldehyde solution is added dropwise with stirring over a period of 15 minutes. The mixture is allowed to stand 12–16 hours at room temperature after which it is acidified with 50% sulfuric acid. After standing 2 hours at 5–10° the crystalline product is collected by filtration. Additional material is obtained by extraction of the filtrate with warm ethyl acetate, drying the extracts and evaporating the volatile material in a vacuum. The product can be recrystallized from acetonitrile for reduction.

Example IV.—2-(1-hydroxyethyl)-6-methylpyromeconic acid

To 126 g. of 6-methylpyromeconic acid in 372 ml. of water is added a solution of 39.6 g. of sodium hydroxide in 126 ml. water. The solution is cooled in an ice bath and 48 g. of acetaldehyde in 80 ml. of water is added dropwise with stirring over a period of 15 minutes. The mixture is allowed to stand 12–16 hours at room temperature after which it is acidified with 50% sulfuric acid. After standing 2 hours at 5–10° the crystalline product is collected by filtration. Additional material is obtained by extraction of the filtrate with warm ethyl acetate, drying the extracts and evaporating the volatile material in a vacuum. The product can be recrystallized from acetonitrile for reduction.

Example V.—2-(1-hydroxy-1-phenylmethyl)-6-methylpyromeconic acid

A solution of benzaldehyde (53 g.) in 175 ml. of dioxane is added to a stirred mixture of 63.1 g. of 6-methylpyromeconic acid, 175 ml. of water, and enough sodium hydroxide to give a pH of 10–11. The temperature is maintained at 60° C. during the addition and for an additional 16 hours with stirring. The mixture is cooled, acidified to a pH of 2.5 with concentrated hydrochloric acid and extracted with ether. After drying the extracts and evaporating the ether the crude product remaining is recrystallized from ethyl acetate.

Example VI.—2-(1-hydroxy-1-decyl)-6-methylpyromeconic acid

To a solution of 75.7 g. of 6-methylpyromeconic acid in 210 ml. of water and sufficient sodium hydroxide to give a pH of 10–11 is added 93.6 g. of decanal in 210 mg. of dioxane. The mixture is stirred vigorously at 60° for 22 hours, adjusted to pH 2 with concentrated hydrochloric acid and allowed to crystallize at room temperature. After collecting the crystals by filtration the filtrate is evaporated to dryness and the remaining material is recrystallized from acetone to give a second crop.

The following compounds are prepared by reacting 6-methylpyromeconic acid with the appropriate aldehyde according to this same procedure.

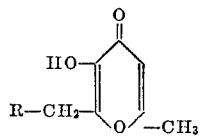

| Aldehyde | R |
|---|---|
| Propionaldehyde | $C_2H_5$ |
| n-Butyraldehyde | $C_3H_7$ |
| iso-Butyraldehyde | $i\text{-}C_3H_7$ |
| n-Hexaldehyde | $C_5H_{11}$ |
| n-Decyl-aldehyde | $C_9H_{19}$ |
| Hexadecanal | $C_{15}H_{31}$ |
| Benzaldehyde | $C_6H_5$ |
| p-Tolualdehyde | $p\text{-}CH_3C_6H_4$ |
| 2-naphthaldehyde | $2\text{-}C_{60}H_7$ |
| 1-naphthaldehyde | $1\text{-}C_{10}H_7$ |
| 2,4-dimethyl-1-naphthaldehyde | $C_{12}H_{11}$ |
| Acetaldehyde | $CH_3$ |
| Octadecanaldehyde | $C_{17}H_{35}$ |
| 5-methyl-1-naphthaldehyde | $C_{11}H_9$ |
| 4-methyl-1-naphthaldehyde | $C_{11}H_9$ |
| 6-methyl-2-naphthaldehyde | $C_{11}H_9$ |
| 4-tolualdehyde | $C_7H_7$ |
| 3-tolualdehyde | $C_7H_7$ |
| 4-dodecylbenzaldehyde | $C_{18}H_{29}$ |
| 4-dodecyl-1-naphthaldehyde | $C_{22}H_{31}$ |
| 6-dodecyl-1-naphthaldehyde | $C_{22}H_{31}$ |
| 4-dodecyl-2-naphthaldehyde | $C_{22}H_{31}$ |
| 6-dodecyl-2-naphthaldehyde | $C_{22}H_{31}$ |
| 4-methoxybenzaldehyde | $4\text{-}CH_3O\text{-}C_6H_4$ |
| 3-methoxybenzaldehyde | $3\text{-}CH_3O\text{-}C_6H_4$ |
| 4-butoxybenzaldehyde | $4\text{-}C_4H_7O\text{-}C_6H_4$ |
| 2-butoxybenzaldehyde | $2\text{-}C_4H_7O\text{-}C_6H_4$ |
| 4-methoxy-1-naphthaldehyde | $4\text{-}CH_3O\text{-}1\text{-}C_{10}H_8$ |
| 6-methoxy-1-naphthaldehyde | $6\text{-}CH_3O\text{-}1\text{-}C_{10}H_8$ |
| 4-butoxy-2-naphthaldehyde | $4\text{-}CH_3O\text{-}2\text{-}C_{10}H_8$ |
| 4-dodecyloxy-1-naphthaldehyde | $4\text{-}C_{12}H_{25}O\text{-}1\text{-}C_{10}H_8$ |
| 6-dodecyloxy-2-naphthaldehyde | $6\text{-}C_{12}H_{25}O\text{-}2\text{-}C_{10}H_8$ |
| 2-chlorobenzaldehyde | $2\text{-}Cl\text{-}C_6H_4$ |
| 2-bromobenzaldehyde | $2\text{-}Br\text{-}C_6H_4$ |
| 2-iodobenzaldehyde | $2\text{-}I\text{-}C_6H_4$ |
| 3-chlorobenzaldehyde | $3\text{-}Cl\text{-}C_6H_4$ |
| 3-bromobenzaldehyde | $3\text{-}Br\text{-}C_6H_4$ |
| 3-iodobenzaldehyde | $3\text{-}I\text{-}C_6H_4$ |
| 4-chlorobenzaldehyde | $4\text{-}Cl\text{-}C_6H_4$ |
| 4-iodobenzaldehyde | $4\text{-}I\text{-}C_6H_4$ |
| 2-chloro-1-napththaldehyde | $2\text{-}Cl\text{-}1\text{-}C_{10}H_8$ |
| 4-chloro-1-naphthaldehyde | $4\text{-}Cl\text{-}1\text{-}C_{10}H_8$ |
| 6-chloro-1-naphthaldehyde | $6\text{-}Cl\text{-}1\text{-}C_{10}H_8$ |
| 2-bromo-1-naphthaldehyde | $2\text{-}Br\text{-}1\text{-}C_{10}H_8$ |
| 6-chloro-2-naphthaldehyde | $6\text{-}Cl\text{-}2\text{-}C_{10}H_8$ |
| 4-chloro-2-naphthaldehyde | $4\text{-}Cl\text{-}2\text{-}C_{10}H_8$ |
| 4-iodo-2-naphthaldehyde | $4\text{-}I\text{-}2\text{-}C_{10}H_8$ |
| 4-hydroxy-1-naphthaldehyde | $4\text{-}HO\text{-}1\text{-}C_{10}H_8$ |
| 5-hydroxy-1-naphthaldehyde | $5\text{-}HO\text{-}1\text{-}C_{10}H_8$ |
| 6-hydroxy-1-naphthaldehyde | $6\text{-}HO\text{-}1\text{-}C_{10}H_8$ |
| 2-hydroxybenzaldehyde | $2\text{-}HO\text{-}C_6H_4$ |
| 3-hydroxybenzaldehyde | $3\text{-}HO\text{-}C_6H_4$ |
| 4-hydroxybenzaldehyde | $4\text{-}HO\text{-}C_6H_4$ |

Example VII.—2,6-dimethylpyromeconic acid

In a reaction flask equipped with a dropping funnel, mechanized stirrer, reflux condenser and thermometer is placed 17.2 parts of 2,6-di(hydroxymethyl) pyromeconic acid prepared as in Example 1, 13 parts zinc dust and 90 parts of water. To the stirred mixture is added 56 parts of 36% hydrochloric acid at such a rate that the temperature of the reaction mixture remains below 65° C. After the acid is added the mixture is stirred at 60–90° C. for 1½ hours and then filtered while hot. The filtrate is adjusted to pH 2 with 12 N sodium hydroxide solution, and allowed to stand 18 hours at 0–5° C. The resulting precipitate after collecting on the filter and drying amounts to 7.3 parts by weight and melts at 136–138° C. Paper chromatographic analysis of the mixture is carried out with a solvent and developer system of 800 ml. chloroform, 40 ml. 90% ethanol and 800 ml. 90% formic acid. The product is thus shown to be a mixture of 2,6-dimethylpyromeconic acid and 6-hydroxymethyl-2-methylpyromeconic acid along with a trace of unreduced starting material.

Example VIII—2-methyl-6-hydroxymethylpyromeconic acid

In a 500 ml. flask fitted with stirrer, thermometer, condenser and addition funnel are placed 180 ml. of water, 34.4 g., 0.2 mole of 2,6-di(hydroxymethyl) pyromeconic acid prepared as in Example I, and 26.0 g., 0.4 mole zinc dust. To this mixture is added dropwise 95 ml., 1.13 eq., of concentrated hydrochloric acid at such a rate that the temperature does not rise above 65° C.; the time required is about 15 minutes. The reaction mixture is then stirred and heated at 60 to 70° C. for an additional 1.5 hours. The mixture is then heated to 90° C. and filtered to remove unreacted zinc metal. The pH of the filtrate is adjusted to about 2.0 by the addition of 12 N sodium hydroxide solution and the resulting mixture is allowed to stand at 5° C. for 12 hours. The yellow product which crystallizes is collected on a filter, pressed free of solvent and air-dried. Recrystallization of the crude product yields 13.9 grams of 2 - methyl-6-hydroxymethylpyromeconic acid or 45% yield of theory. The product contains minor amounts of 2,6-dimethylpyromeconic acid. The product melts at 138–140° C.

The product is further purified by dissolving 15.2 g. in 30 ml. hot water. The resulting mixture is cooled to 5° C. whereupon the product recrystallizes. The product is removed by filtration and dried in a desiccator over phosphorus pentoxide. After further recrystallization from an equal weight of methanol, there is obtained 2-methyl-6-hydroxymethylpyromeconic acid, M.P. 145–145.5° C.

The procedure is repeated substituting for the zinc dust, stoichiometrically equivalent amounts of the following metals: iron, aluminum, tin and magnesium. Substantially the same results are obtained.

The procedure is repeated substituting for the hydrochloric acid stoichiometrically equivalent amounts of the following acids: sulfuric, formic, acetic and isodecanoic. With the $C_{10}$ acid, it is desirable to add an appropriate quantity of a co-solvent to the predominately aqueous system to promote solubility. Substantially the same results are obtained.

The following compounds are prepared from the compounds of Example II by this same procedure:

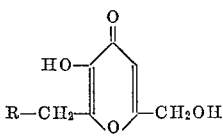

| R | |
|---|---|
| $C_2H_5$ | $C_{17}H_{35}$ |
| n-$C_3H_7$ | 5-$(CH_3)$-1-$C_{10}H_6$ |
| i-$C_3H_7$ | 4-$(CH_3)$-1-$C_{10}H_6$ |
| $C_5H_{11}$ | 6-$(CH_3)$-2-$C_{10}H_6$ |
| $C_9H_{19}$ | 4-$(CH_3)$-$C_6H_4$ |
| $C_{15}H_{31}$ | 3-$(CH_3)$-$C_6H_4$ |
| $C_6H_5$ | 4-$(C_{12}H_{25})$-$C_6H_4$ |
| 4-$CH_3$-$C_6H_4$ | 4-$(C_{12}H_{25})$-1-$C_{10}H_6$ |
| 2-$C_{10}H_7$ | 6-$(C_{12}H_{25})$-1-$C_{10}H_6$ |
| 1-$C_{10}H_7$ | 4-$(C_{12}H_{25})$-2-$C_{10}H_6$ |
| 2,4-$(CH_3)_2$-1-$C_{10}H_5$ | 6-$(C_{12}H_{25})$-2-$C_{10}H_6$ |
| $CH_3$ | |

Example IX—6-chloromethyl-2-methylpyromeconic acid

Ten parts of 6 - (1-hydroxymethyl)-2-methylpyromeconic acid and 50 parts of thionyl chloride are cautiously heated with stirring until reflux begins. Reflux is continued for 1 hour. (Only a small theoretical excess of thionyl chloride is necessary if a solvent such as chloroform is used.) Volatile products are removed under vacuum, leaving the crude chloro derivative.

Recrystallization from a mixture of cyclohexane and benzene gives better than 80% yield of 6-chloromethyl-2-methylpyromeconic acid suitable for zinc reduction.

The following compounds are prepared from the compounds of Example VIII by this same procedure:

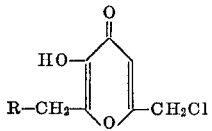

| R | |
|---|---|
| $C_2H_5$ | 6-$C_4H_7O$-$C_6H_4$ |
| n-$C_3H_7$ | 4-$CH_3O$-1-$C_{10}H_8$ |
| i-$C_3H_7$ | 6-$CH_3O$-1-$C_{10}H_8$ |
| $C_5H_{11}$ | 4-$CH_3O$-2-$C_{10}H_8$ |
| $C_9H_{19}$ | 4-$C_{12}H_{25}O$-1-$C_{10}H_8$ |
| $C_{15}H_{31}$ | 6-$C_{12}H_{25}O$-2-$C_{10}H_8$ |
| $C_6H_5$ | 2-Cl-$C_6H_4$ |
| 4-$CH_3$-$C_6H_4$ | 2-Br-$C_6H_4$ |
| 2-$C_{10}H_7$ | 2-I-$C_6H_4$ |
| 1-$C_{10}H_7$ | 3-Cl-$C_6H_4$ |
| 2,4-$(CH_3)_2$-1-$C_{10}H_5$ | 3-Br-$C_6H_4$ |
| $CH_3$ | 3-I-$C_6H_4$ |
| $C_{17}H_{35}$ | 4-Cl-$C_6H_4$ |
| 5-$(CH_3)$-1-$C_{10}H_6$ | 4-I-$C_6H_4$ |
| 4-$(CH_3)$-1-$C_{10}H_6$ | 2-Cl-1-$C_{10}H_8$ |
| 6-$(CH_3)$-2-$C_{10}H_6$ | 4-Cl-1-$C_{10}H_8$ |
| 4-$(CH_3)$-$C_6H_4$ | 6-Cl-1-$C_{10}H_8$ |
| 3-$(CH_3)$-$C_6H_4$ | 2-Br-1-$C_{10}H_8$ |
| 4-$(C_{12}H_{25})$-$C_6H_4$ | 6-Cl-2-$C_{10}H_8$ |
| 4-$(C_{12}H_{25})$-1-$C_{10}H_6$ | 4-Cl-2-$C_{10}H_8$ |
| 6-$(C_{12}H_{25})$-1-$C_{10}H_6$ | 4-I-2-$C_{10}H_8$ |
| 4-$(C_{12}H_{25})$-2-$C_{10}H_6$ | 4-HO-1-$C_{10}H_8$ |
| 6-$(C_{12}H_{25})$-2-$C_{10}H_6$ | 5-HO-1-$C_{10}H_8$ |
| 4-$CH_3O$-$C_6H_4$ | 6-HO-1-$C_{10}H_8$ |
| 5-$CH_3O$-$C_6H_4$ | 2-HO-$C_6H_4$ |
| 4-$C_4H_7O$-$C_6H_4$ | 3-HO-$C_6H_4$ |
| | 4-HO-$C_6H_4$ |

Example X—2,6-dimethylpyromeconic acid

Into a 200 ml., 3-necked round bottomed flask equipped with a mechanical stirrer, thermometer and reflux condenser is placed 21 g. of 6-chloromethyl-2-methylpyromeconic acid and 13 g. of zinc dust. 60 ml. of glacial acetic acid is added. The temperature is maintained at 60–70° for 2 hours. Residual zinc is removed by filtration and most of the acetic acid is removed in vacuo. 100 ml. of water is added, the pH is adjusted to 2 and the mixture is extracted with three 30 ml. portions of chloroform. The chloroform extracts are dried over anhydrous calcium sulfate. Evaporation of the chloroform results in a 60–70% yield of 2,6-dimethylpyromeconic acid.

The following compounds are prepared from the compounds of Example IX by this same procedure:

| R | |
|---|---|
| | 6-$C_4H_7O$-$C_6H_4$ |
| $C_2H_5$ | 4-$CH_3O$-1-$C_{10}H_8$ |
| n-$C_3H_7$ | 6-$CH_3O$-1-$C_{10}H_8$ |
| i-$C_3H_7$ | 4-$CH_3O$-2-$C_{10}H_8$ |
| $C_5H_{11}$ | 4-$C_{12}H_{25}O$-1-$C_{10}H_8$ |
| $C_9H_{19}$ | 6-$C_{12}H_{25}O$-2-$C_{10}H_8$ |
| $C_{15}H_{31}$ | 2-Cl-$C_6H_4$ |
| $C_6H_5$ | 2-Br-$C_6H_4$ |
| 4-$CH_3$-$C_6H_4$ | 2-I-$C_6H_4$ |
| 2-$C_{10}H_7$ | 3-Cl-$C_6H_4$ |
| 1-$C_{10}H_7$ | 3-Br-$C_6H_4$ |
| 2,4-$(CH_3)_2$-1-$C_{10}H_5$ | 3-I-$C_6H_4$ |
| $CH_3$ | 4-Cl-$C_6H_4$ |
| $C_{17}H_{35}$ | 4-I-$C_6H_4$ |
| 5-$(CH_3)$-1-$C_{10}H_6$ | 2-Cl-1-$C_{10}H_8$ |
| 4-$(CH_3)$-1-$C_{10}H_6$ | 4-Cl-1-$C_{10}H_8$ |

Example XI.—2-ethyl-6-methylpyromeconic acid

A mixture of 40 g. of 2-(1-hydroxyethyl)-6-methyl-pyromeconic acid, Example IV, in 295 ml. of water is heated to 30°. With vigorous stirring, 30.8 g. of zinc dust is added followed by 82 ml. of concentrated hydrochloric acid dropwise over a 30 minute period while the temperature is raised to 65° and held there for 1 hour. Excess zinc is filtered from the hot mixture and washed with hot water. The washings are combined with the filtrate and the combined aqueous mixture is cooled to 5°. Crystalline 2 - ethyl-6-methylpyromeconic acid is collected by filtration. Extraction of the filtrate with chloroform gives additional product. The product is recrystallized from ethanol.

Example XII.—2-benzyl-6-methylpyromeconic acid

To a stirred mixture of 23.3 g. of 2-(1-hydroxy-1-phenylmethyl)-6-methylpyromeconic acid, Example V, 13.1 g. of zinc dust and 125 ml. of 25% aqueous ethanol is added 35 ml. of concentrated hydrochloric acid over a 25 minute period. The temperature is maintained at 60–65° during the addition and for an additional hour of stirring. The reaction mixture is cooled and filtered. The solid in the filter and the filtrate are both extracted several times with warm ethyl acetate. The extracts are combined, cooled and concentrated whereupon the product is crystallized and collected by filtration.

The following compounds are prepared by reducing the compounds of Example VI by this same procedure:

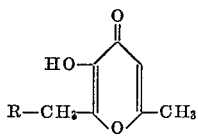

| R | |
|---|---|
| $C_2H_5$ | $6\text{-}C_4H_7O\text{-}C_6H_4$ |
| $n\text{-}C_3H_7$ | $4\text{-}CH_3O\text{-}1\text{-}C_{10}H_8$ |
| $i\text{-}C_3H_7$ | $6\text{-}CH_3O\text{-}1\text{-}C_{10}H_8$ |
| $C_5H_{11}$ | $4\text{-}CH_3O\text{-}2\text{-}C_{10}H_8$ |
| $C_9H_{19}$ | $4\text{-}C_{12}H_{25}O\text{-}1\text{-}C_{10}H_8$ |
| $C_{15}H_{31}$ | $6\text{-}C_{12}H_{25}O\text{-}2\text{-}C_{10}H_8$ |
| $C_6H_5$ | $2\text{-}Cl\text{-}C_6H_4$ |
| $4\text{-}CH_3\text{-}C_6H_4$ | $2\text{-}Br\text{-}C_6H_4$ |
| $2\text{-}C_{10}H_7$ | $2\text{-}I\text{-}C_6H_4$ |
| $1\text{-}C_{10}H_7$ | $3\text{-}Cl\text{-}C_6H_4$ |
| $2,4\text{-}(CH_3)_2\text{-}1\text{-}C_{10}H_5$ | $3\text{-}Br\text{-}C_6H_4$ |
| $CH_3$ | $3\text{-}I\text{-}C_6H_4$ |
| $C_{17}H_{35}$ | $4\text{-}Cl\text{-}C_6H_4$ |
| $5\text{-}(CH_3)\text{-}1\text{-}C_{10}H_6$ | $4\text{-}I\text{-}C_6H_4$ |
| $4\text{-}(CH_3)\text{-}1\text{-}C_{10}H_6$ | $2\text{-}Cl\text{-}1\text{-}C_{10}H_8$ |
| $6\text{-}(CH_3)\text{-}2\text{-}C_{10}H_6$ | $4\text{-}Cl\text{-}1\text{-}C_{10}H_8$ |
| $4\text{-}(CH_3)\text{-}C_6H_4$ | $6\text{-}Cl\text{-}1\text{-}C_{10}H_8$ |
| $3\text{-}(CH_3)\text{-}C_6H_4$ | $2\text{-}Br\text{-}1\text{-}C_{10}H_8$ |
| $4\text{-}(C_{12}H_{25})\text{-}C_6H_4$ | $6\text{-}Cl\text{-}2\text{-}C_{10}H_8$ |
| $4\text{-}(C_{12}H_{25})\text{-}1\text{-}C_{10}H_6$ | $4\text{-}Cl\text{-}2\text{-}C_{10}H_8$ |
| $6\text{-}(C_{12}H_{25})\text{-}1\text{-}C_{10}H_6$ | $4\text{-}I\text{-}2\text{-}C_{10}H_8$ |
| $4\text{-}(C_{12}H_{25})\text{-}2\text{-}C_{10}H_6$ | $4\text{-}HO\text{-}1\text{-}C_{10}H_8$ |
| $6\text{-}(C_{12}H_{25})\text{-}2\text{-}C_{10}H_6$ | $5\text{-}HO\text{-}1\text{-}C_{10}H_8$ |
| $4\text{-}CH_3O\text{-}C_6H_4$ | $6\text{-}HO\text{-}1\text{-}C_{10}H_8$ |
| $5\text{-}CH_3O\text{-}C_6H_4$ | $2\text{-}HO\text{-}C_6H_4$ |
| $4\text{-}C_4H_7O\text{-}C_6H_4$ | $3\text{-}HO\text{-}C_6H_4$ |
| | $4\text{-}HO\text{-}C_6H_4$ |

Example XIII.—2-decyl-6-methylpyromeconic acid

Concentrated hydrochloric acid is added dropwise over a 30 minute period to a well stirred mixture of 28.1 g. of 2-(1-hydroxy-1-decyl)-6-methylpyromeconic acid, Example VI, 13.1 g. of zinc dust and 125 ml. of 25% aqueous ethanol. The temperature is brought to 60–65° during this addition and maintained there for 1 hour. Upon cooling, crystallization occurs. After the product is collected by filtration, it can be recrystallized from hexane.

Example XIV.—2,6-dimethylpyromeconic acid

A mixture of 40 g. of 2-(1-hydroxymethyl)-6-methyl-pyromeconic acid, prepared as in Example III, in 295 ml. of water is heated to 30° C. With vigorous stirring, 30.8 g. of zinc dust is added, followed by the dropwise addition of 82 ml. concentrated hydrochloric acid over a 30 minute period. The temperature is raised to 65° C. and held for 1 hour. Excess zinc is filtered from the hot mixture and washed with hot water. The washings are combined with the filtrate and the combined aqueous mixture is cooled to 5° C. Crystalline 2,6-dimethylpyromeconic acid is collected by several recrystallizations using, alternately, acetonitrile and ethanol.

Example XV.—2-morpholinomethyl-6-hydroxymethylpyromeconic acid

In a 12 liter flask are placed 3.5 liters of ethanol, 350 g., 4.0 moles morpholine and 320 g., 4.0 moles of 37% aqueous formaldehyde. The reaction is stirred vigorously for 14 minutes. To the reaction mixture is added 430 g., 3.0 moles of kojic acid all at once together with an additional 250 ml. ethanol. After about 5 minutes of stirring, most of the kojic acid has gone into solution and, after about 10 minutes, the product is observed to crystallize out. The reaction mixture is stirred for an additional 45 minutes, then is allowed to stand overnight. The crystals are collected on a filter and air-dried. After drying, 2-morpholinomethyl - 6 - hydroxymethylpyromeconic acid, 632 g., M.P. 164–165° C., is obtained. This corresponds to 88% yield of the theoretical.

The procedure is repeated substituting for morpholine, stoichiometrically equivalent amounts of the following amines: piperidine, dimethylamine, and di-n-butylamine. There are obtained respectively 2-piperidinomethyl-6-hydroxymethylpyromeconic acid 2 - dimethylaminomethyl - 6 - hydroxymethylpyromeconic acid; and 2-di-n-butylaminomethyl-6-hydroxymethylpyromeconic acid.

Example XVI.—2-methyl-6-hydroxymethylpyromeconic acid

In a 2-liter, round-bottom flask equipped with a stirrer, condenser, thermometer and addition funnel is placed 96.4 g., 0.4 mole of 2 - morpholinomethyl-6-hydroxy methylpyromeconic acid, prepared as in Example XV, 52 g., 0.8 g.-atoms zinc metal dust and 720 ml. water. To this mixture is added 225 ml., 2.67 equivalents of concentrated hydrochloric acid at such a rate that the temperature remains in the 50–55° C. range the addition requires about 30 minutes. After all the acid has been added, the reaction mixture is stirred and heated at 50–55° C. for an additional 1.5 hours. The reaction mixture is then heated to 90° C. and unreacted zinc metal is recovered by filtration. The light yellow filtrate is treated with 65 ml. of an aqueous 50% sodium hydroxide solution during which time the pH reaches about 2. The resulting mixture is cooled to 5° C. in an ice-water bath, then the pH is raised to 10 by the addition of 85 ml. of 50% sodium hydroxide solution. The zinc hydroxide which precipitates is removed by filtration. The filter cake washed with 25 ml. water and the washings are combined with the original filtrate. The pH of the filtrate is adjusted to 2.0 by the addition of about 65 ml. of concentrated hydrochloric acid. The acidic solution is concentrated to about one-fourth by volume at a pressure corresponding to about 20 mm. Hg. The concentrate is cooled to 5° C. and is allowed to stand for 48 hours. The crystalline product which precipitates is collected on a filter and air-dried. There is obtained 22.7 g. of 2-methyl-6-hydroxymethylpyromeconic acid, 36% yield of theoretical, M.P. 133–136° C., and minor amounts of 2,6-dimethylpyromeconic acid. This product can be further purified by recrystallization from an equal weight of methanol, M.P. 144–145° C. In the same manner, 2-piperidinomethyl - 6 - hydroxymethylpyromeconic acid, 2 - dimethylaminomethyl - 6 - hydroxymethylpyromeconic acid and 2-di-n-butylaminomethyl-6-hydroxymethylpyromeconic acid are reduced to 2,6-dimethylpyromeconic acid.

Example XVII

To 25.2 g., 0.2 mole of 6-methylpyromeconic acid in 100 ml. of water is added a solution of 8 g. sodium hydroxide in 60 ml. water. The solution is cooled in an ice bath and 18 g. of a 37% formaldehyde solution is added dropwise with stirring over a period of 15 minutes. The mixture is allowed to stand 12–16 hours at room temperature. To the reaction mixture is added 24.6 g. of zinc dust with vigorous stirring, followed by the dropwise addition of 65 ml. concentrated hydrochloric acid over a 30 minute period. The temperature is raised to 65° C. and maintained at that temperature for one hour. Excess zinc is filtered from the hot mixture and washed with hot water. The washings are combined and the combined aqueous mixture is cooled to 5° C. Crystalline 2,6-dimethylpyromeconic acid is collected by filtration. Extraction of the filtrate with chloroform gives additional product. The total yield is 18.5 g. which is 66% of the theoretical yield based on 6-methylpyromeconic acid.

Example XVIII

Aqueous solutions of 2-ethyl-6-methylpyromeconic acid and maltol are serially diluted and matched as to odor intensity. It is found that 2-ethyl-6-methylpyromeconic acid has an aroma 3 times as strong as maltol.

Example XIX 2,6-dimethylpyromeconic acid is added to chocolate bars by melting the bars and incorporating 125 and 250 parts per million by weight into two samples. The bars are recast and are tested and compared with chocolate to which no 2,6-dimethylpyromeconic acid has been added. It is found that 2,6-dimethylpyromeconic acid increases the richness of the chocolate flavor and creates a blended taste by evening of the harsh chocolate notes and lifting the aroma, as compared to the control.

Example XX.—2-benzyl-6-methylpyromeconic acid

The aroma-enhancing properties of 2-benzyl-6-methylpyromeconic acid are demonstrated by its use in the following jasmin perfume base formula.

| | Parts |
| --- | --- |
| Benzyl acetate | 40 |
| Linalool | 10 |
| α-Amylcinnamic aldehyde | 10 |
| 2-benzyl-6-methylpyromeconic acid | 10 |
| Cinnamic alcohol | 5 |
| Phenylethyl alcohol | 5 |

The presence of the 2-benzyl-6-methylpyromeconic acid enhances the floral note and improves the tenacity of the perfume.

Example XXI

A chocolate fudge is prepared containing 2-decyl-6-methylpyromeconic acid. The sample portions each of which contains 80 p.p.m. by weight of flavor-enhancer is compared to a control fudge. The substituted pyromeconic acid strongly reinforce the chocolate flavor and the product is judged to have a more pleasant fragrance compared to the control.

Creme candies are prepared containing 60 p.p.m. of 2-decyl-6-methylpyromeconic acid; they are found to have significantly better flavor than samples which do not contain the acid.

Example XXII

Pineapple juice flavor is pleasingly enhanced with 2-ethyl-6-methylpyromeconic acid is added at 20 p.p.m., and compared with a control.

Twenty p.p.m. of 2-ethyl-6-methylpyromeconic acid added to a raspberry flavored beverage greatly amplifies the sweet raspberry aroma.

Example XXIII

The flavor of vanilla ice cream is pleasingly enhanced when 2-(betanaphthylmethyl)-6-methylpyromeconic acid is added at a level of 30 p.p.m. and compared with a control. Similar results are obtained when 2-(4-methyl-1-naphthylmethyl)-6-methylpyromeconic acid is added at 30 p.p.m. and when 2-(6-butyl-1-naphthylethyl)-6-methylpyromeconic acid is added to ice cream at 40 p.p.m.

Example XXIV

A maple syrup is prepared containing 80 p.p.m. by weight of 2-(3-methyl-benzyl)-6-methylpyromeconic acid. The syrup is found to have a richer and fuller maple taste, as compared to a control syrup. Similar results are obtained when 80 p.p.m. of 2-(4-butylbenzyl)-6-methylpyromeconic acid is added to a maple syrup and also when 2-(4 - methoxybenzyl) - 6 - methylpyromeconic acid is added to syrup at 80 p.p.m.

Example XXV

Almond flavored creme candies are prepared containing 80 p.p.m. of 2-(6-methoxy-2-naphthylmethyl)-5-methylpyromeconic acid; they are found to have significantly better flavor than samples which do not contain the acid. Similar results are obtained when 80 p.p.m. of 2-(4-butoxy - 2 - naphthylmethyl)-6-methylpyromeconic acid are added to the candies and also when 80 p.p.m. of 2-(4-hydroxy - 1 - naphthylmethyl)-6-methylpyromeconic acid are added to the candies.

Example XXVI

Prune juice is pleasingly enhanced when 60 p.p.m. of 2 - (2 - hydroxybenzyl) - 6 - methylpyromeconic acid is added and compared to a control juice. Similar results are obtained when 60 p.p.m. of 2-(2-chlorobenzyl)-6-methylpyromeconic acid are added to the juice and also when 60 p.p.m. of 2-(3-bromobenzyl)-6-methylpyromeconic acid are added to the juice.

Example XXVII

When chocolate bars are melted and 120 p.p.m. of 2-(4 - iodobenzyl) - 6 - methylpyromeconic acid, 2-(4-iodo-2-naphthylmethyl) - 6 - methylpyromeconic acid, 2 - (4 - chloro - 1 - naphthylmethyl)-6-methylpyromeconic acid, respectively, are added to 3 sample bars and recast into each sample is found to have a smoother and richer taste and an enchanced chocolate aroma when compared to a control bar.

What is claimed is:

1. A compound of the formula:

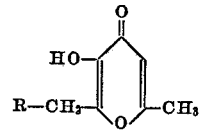

wherein R is alkyl having from 1 to 17 carbon atoms, phenyl, naphthyl, substituted phenyl or substituted naphthyl and each of said substituents is alkyl having from 1 to 12 carbon atoms, hydroxy, chlorine, bromine, iodine, or alkoxy having from 1 to 12 carbon atoms.

2. 2-ethyl-6-methylpyromeconic acid.
3. 2-benzyl-6-methylpyromeconic acid.
4. A compound having the formula:

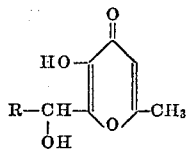

wherein R is hydrogen, alkyl having from 1 to 17 carbon atoms, phenyl, naphthyl, substituted phenyl or substituted naphthyl and each of said substituents is alkyl having from 1 to 12 carbon atoms, hydroxy, chlorine, bromine, iodine, or alkoxy having from 1 to 12 carbon atoms.

References Cited

UNITED STATES PATENTS

| | | | |
|---|---|---|---|
| 3,130,204 | 4/1964 | Tate et al. | 260—345.9 |
| 3,159,652 | 12/1964 | Tate et al. | 260—345.9 |
| 3,365,469 | 1/1968 | Tate et al. | 260—345.9 |

OTHER REFERENCES

Ichimoto et al.: Chem. Abstracts, vol. 62, col. 14613 (June 1965). QD 1.A51.

Dashunin et al.: Chem. Abstracts, vol. 61, cols. 11841-2 (1964). QD 1.A51.

HENRY R. JILES, Primary Examiner

J. M. FORD, Assistant Examiner

U.S. Cl. X.R.

99—23, 28, 134, 136, 140; 252—106, 396, 522; 260—247.7, 294.7, 999